United States Patent [19]
Conder et al.

[11] Patent Number: 5,453,608
[45] Date of Patent: Sep. 26, 1995

[54] TRIGGERABLE ELECTRO-OPTIC AMPLITUDE MODULATOR BIAS STABILIZER FOR INTEGRATED OPTICAL DEVICES

[75] Inventors: Alan D. Conder; Ronald E. Haigh, both of Tracy; Keith F. Hugenberg, Livermore, all of Calif.

[73] Assignee: The Rgents of the University of California, Oakland, Calif.

[21] Appl. No.: 240,448

[22] Filed: May 10, 1994

[51] Int. Cl.⁶ .................................................. G01J 1/32
[52] U.S. Cl. ............................ 250/205; 385/2; 385/14
[58] Field of Search ........................ 250/205, 214 R, 250/227.11, 227.12, 227.21; 455/126, 127; 359/181, 187; 385/2, 3, 14

[56] References Cited

U.S. PATENT DOCUMENTS

| | | | |
|---|---|---|---|
| 4,611,362 | 9/1986 | Fujito et al. ............................ 455/609 |
| 4,709,416 | 11/1987 | Patterson ................................ 455/609 |
| 4,709,417 | 11/1987 | Kuwabara ............................... 455/611 |
| 4,903,273 | 2/1990 | Bathe ...................................... 372/38 |
| 5,003,624 | 3/1991 | Terbrack et al. ....................... 455/618 |
| 5,065,456 | 11/1991 | Nakayama et al. .................... 359/187 |
| 5,091,797 | 2/1992 | Proebster ................................ 359/187 |
| 5,343,324 | 8/1994 | Le et al. .................................. 359/181 |

Primary Examiner—Edward P. Westin
Assistant Examiner—Que T. Le
Attorney, Agent, or Firm—Henry P. Sartorio

[57] ABSTRACT

An improved Mach-Zehnder integrated optical electro-optic modulator is achieved by application and incorporation of a DC bias box containing a laser synchronized trigger circuit, a DC ramp and hold circuit, a modulator transfer function negative peak detector circuit, and an adjustable delay circuit. The DC bias box ramps the DC bias along the transfer function curve to any desired phase or point of operation at which point the RF modulation takes place.

24 Claims, 5 Drawing Sheets

TRIGGERABLE ELECTRO-OPTIC AMPLITUDE MODULATOR BIAS STABILIZER FOR INTEGRATED OPTICAL DEVICES

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The invention relates generally to the art of optical data transmission apparatus and methods and more specifically to a variable phase DC bias controller for an electro-optic modulator.

2. Description of Related Art

Interferometric electro-optic amplitude modulators, such as Mach-Zehnder and YBBM modulators, have recently become of great interest in the high density communications industry for high bandwidth data communications. An electro-optic modulator acts like a transducer of sorts that converts electrical energy or data into optical energy or data. A Mach-Zehnder modulator is one type of electro-optic modulator that enables a high bandwidth electrical signal to modulate an optical beam, which can then be transmitted over great distances using fiber optic cables. Electrical signals with bandwidths well into the GHz region can be used to modulate the optical signal carried over these cables.

Transmission of data using optical carriers enables, in addition to very high bandwidths, great numbers of mUltipiexed channels with low signal loss and distortion. In a typical electro-optic modulator, a laser light beam is amplitude modulated with a data signal, and propagates to a remote receiver either directly through the atmosphere, or via a system of optical fibers and repeaters. The light beam may advantageously be modulated with electrical signals in the microwave frequency range using an electro-optic modulator such as the Mach-Zehnder modulator. An electro-optic modulator based on a Mach-Zehnder interferometer generally includes a monolithic substrate formed of an electro-optic material such as $LiNbO_3$ or GaAs. An optical waveguide is formed in the substrate having two arms or branches of equal length which extend generally in parallel to each other, wherein the index of refraction of the material in the waveguide is higher than the index of refraction of the material of the substrate.

In the absence of an applied electrical bias voltage, an optical input to the waveguide divides the laser light equally between the branches. Optical signals propagating through the branches can recombine at the optical output of the waveguide in phase or out of phase with each other. An electrical bias voltage differential applied to one branch of the waveguide relative to the other branch causes the indices of refraction of the material in the branches to vary differently due to electro-optic effects, thereby changing the effective optical lengths of the branches. At a bias voltage known in the art as $V_\pi$, the effective optical lengths are varied to such an extent that the optical signals emerging from the branches are 180° out of phase, with each other. $V_\pi$ is the voltage required to go from a minimum to a maximum in optical output.

Prior art optical communication applications have been carried out at a $V_\pi/2$ voltage which produces a preferred linear operation at that point, and indeed efforts have been made to keep that point from drifting due to device instabilities and environmental effects, especially temperature variations. The linear bias point had to be maintained during any link operation to achieve maximum dynamic range since second order harmonic and intermodulation distortion (fringes) increase rapidly with increasing bias voltage error. There exists a need, and it would be preferable to operate an integrated optical Mach-Zehnder modulator at virtually any point of the sinusoidal optical output curve. All prior art DC bias applications were oriented to maintaining modulation at the $V_\pi/2$ point of the optical curve, which does not give the desired flexibility to modulate anywhere on the output curve. The invention disclosed herein conveniently dispenses with the foregoing limitations.

OBJECTS OF THE INVENTION

It is therefore an object of the invention to stabilize the operating point of the phase of an electro-optic Mach-Zehnder modulator.

Another object is to enable a Mach-Zehnder modulator to be operable at any point or phase of the sinusoidal transfer function.

Still another object is to make a Mach-Zehnder modulator triggerable to a specific event such as firing a laser.

Yet another object is to prevent any artifact of the DC determined phase stabilization process from affecting the transmitted RF signal.

Still other more advantages features, improvements and useful benefits will become more readily apparent in view of the attached drawing, the following detailed description of the preferred and best mode enabling embodiment, and as interpreted and limited in scope only by the appended claims.

SUMMARY OF THE INVENTION

The invention is method and apparatus for applying an improved DC bias modulation to a conventional integrated optical Mach-Zehnder electro-optic modulator. The invention circuit is enclosed within a DC bias box and consists of four basic interrelated circuits or elements: a trigger circuit, a ramp and hold circuit, a negative peak detection circuit, and an adjustable delay circuit. The trigger circuit is applied to and initiates the DC ramp and hold circuit which is in turn applied to the DC port of the Mach-Zehnder modulator. The trigger circuit receives an external pulse coordinated with a laser acting upon the Mach-Zehnder modulator, isolates and converts that pulse to a TTL pulse, and initiates timing of other elements of the bias box. The DC ramp and hold circuit initiates, amplifies, and integrates the DC bias current which when applied to one arm of the Mach-Zehnder modulator causes the modulator $cos^2$ transfer function, to yield a sinusoidal optical output. At a specific point or phase φ of the transfer function the DC ramp is stopped and held steady for a predetermined period in which the RF data to be transmitted is applied to the RF port of the Mach-Zehnder modulator.

A small portion of the optical output is applied to and monitored by the negative peak detection circuit in the bias box which is configured to find or determine the next lowest point on the $cos^2$ transfer function from which the DC ramp is to periodically begin its upward ramp again. If the DC ramp increases for a known time interval, then an exact phase determined by DC modulation can be achieved at which point the RF modulation can be applied. The DC ramp time interval, and therefore the phase of RF modulation, can be varied and set by the adjustable delay circuit which couples the negative peak detector circuit to the ramp and hold circuit.

DETAILED DESCRIPTION OF THE INVENTION

Figure 1:
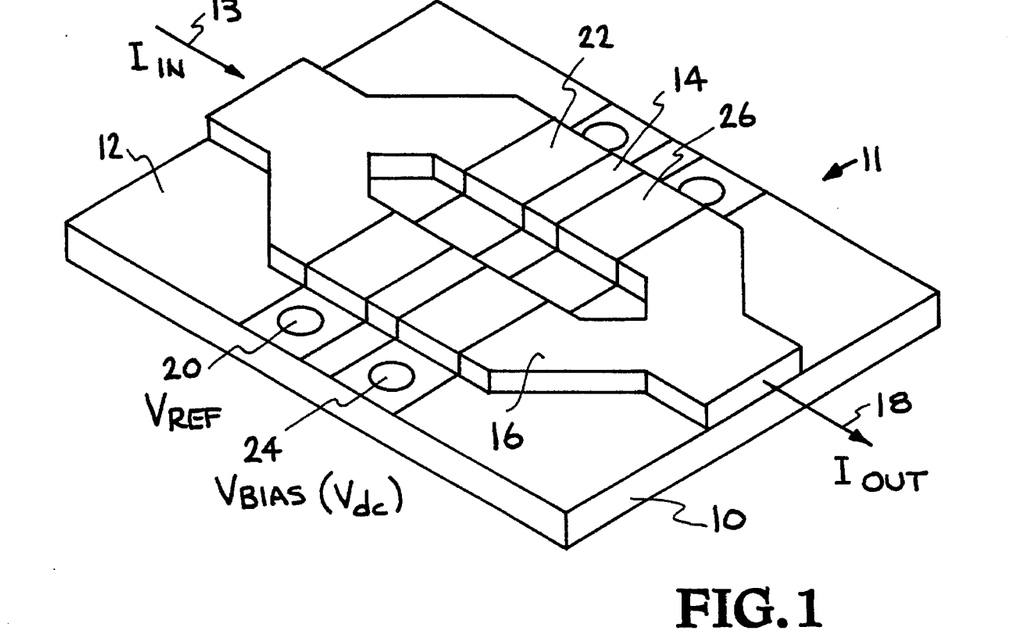
FIG. 1 illustrates a typical Mach-Zehnder modulator in which the invention is used.

In a typical Mach-Zehnder modulator 11 illustrated in the perspective view of FIG. 1, a monolithic substrate 10 of electro-optic material such as $LiNbO_3$ is provided from which is formed an optical waveguide 12 with a single optical input 13 ($I_i$) and having first and second initially divergent arms or branches 14 and 16 of equal length which extend generally in parallel with each other a short distance and converge to yield a single optical output 18 ($I_o$). An RF voltage input 20 ($V_{rf}$) is applied across a first metallic or conductive pad 22, and a DC bias voltage input 24 ($V_{dc}$ or $V_{bias}$) is applied across a second metallic or conductive pad 26. RF input voltage ($V_{rf}$) is used to couple a high bandwidth electrical signal into the Mach-Zehnder modulator, and DC bias voltage ($V_{dc}$) is used to position the RF signal to the operating phase of the Mach-Zehnder's transfer function given by the following formula, where $V_{rc}$ is a voltage swing of 180° in phase:

$$I_o = I_i cos^2[\pi V_{rf}(t)/2V_\pi + \phi_i + \phi(V_{dc}(t))]$$

Figure 2:
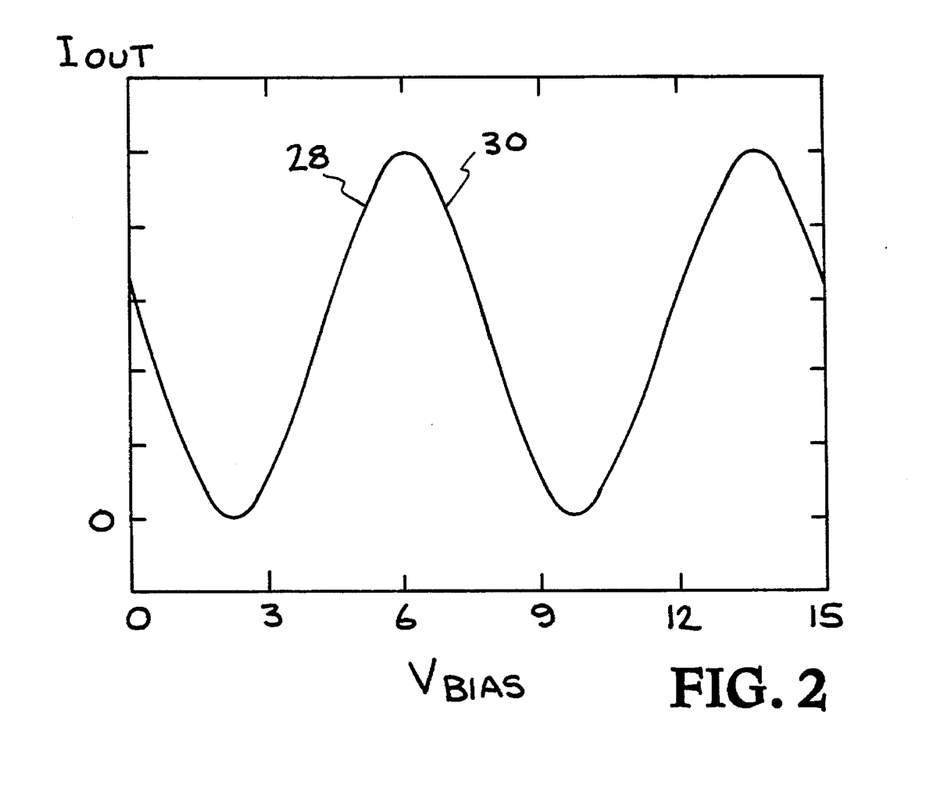
FIG. 2 is the sinusoidal output of an increasing DC modulation of one arm of the Mach-Zehnder modulator.

$I_o$ is the optical output power from the modulator, and as indicated in the above formula, is dependent on the optical input power ($I_i$), the RF signal ($V_{rf}$), and the DC electrical bias signal ($V_{dc}$). The unbiased phase of the modulator is indicated by $\phi_i$ and the $V_\pi$ term is the period (180°) of the transfer function in voltage space. A plot of the modulator's transfer function ($I_o/V_{dc}$) is illustrated in the graph of FIG. 2. It can be observed that the optical output 18 is a sinusoidal function of the DC bias input 24; i.e. applying a voltage to the $V_{dc}$ port will cause the optical output ($I_o$) to be modulated as indicated in FIG. 2.

Again, FIG. 2 illustrates a typical transfer function for modulator 11. By applying a DC electrical signal 24 to modulator 11, the optical signal will be modulated according to $cos^2$ as indicated in FIG. 2. The periodic nature of the transfer function will cause the output to exhibit an equal amplitude with differing slopes for different points on the transfer function curve as indicated in FIG. 2. A positive slope exists at point 28 and a negative slope exists at point 30 with the same optical output for each. An identified operating point must therefore be established in order to determine the slope at which the modulator is operating.

An operating point can be established by applying a DC bias signal 24 to one port of a Mach-Zehnder modulator 11 with a separate electrical port used by a modulating RF signal input 20. A typical setup is illustrated in the simplified block diagram of FIG. 3, where a laser 32 is depicted emitting an input optical beam 13 into modulator 11 which is acted upon by both RF and DC inputs 20 and 24 to yield the modulated optical output 18. As with all prior art, however, the operating point of the modulator is not stable and will gradually change over time and temperature even with a stable DC electrical signal.

In view of FIG. 2 and in light of the above formula, it will be apparent that by adjusting the DC voltage ($V_{dc}$), the operating phase of the modulator will be changed. For most applications, it is desirable to adjust and set the operating phase of the modulator such that an optimum dynamic performance is achieved. Unfortunately, as in all prior art, the phase term φ is not constant and will drift over time and temperature. The essence of the invention disclosed herein is a process and electrical circuit that will identify a specific point on the modulated output curve and thereby set the operating phase of the modulator at that specific point before a signal is applied to the $V_{rf}$ input. The operating phase of the modulator will then be known for a short duration, before the phase φ can drift appreciably. To implement the invention process, however, latency intervals must be created in the RF input signal in order that the phase can be set before input of the beam modulating RF input signal.

Figures 3, 4:
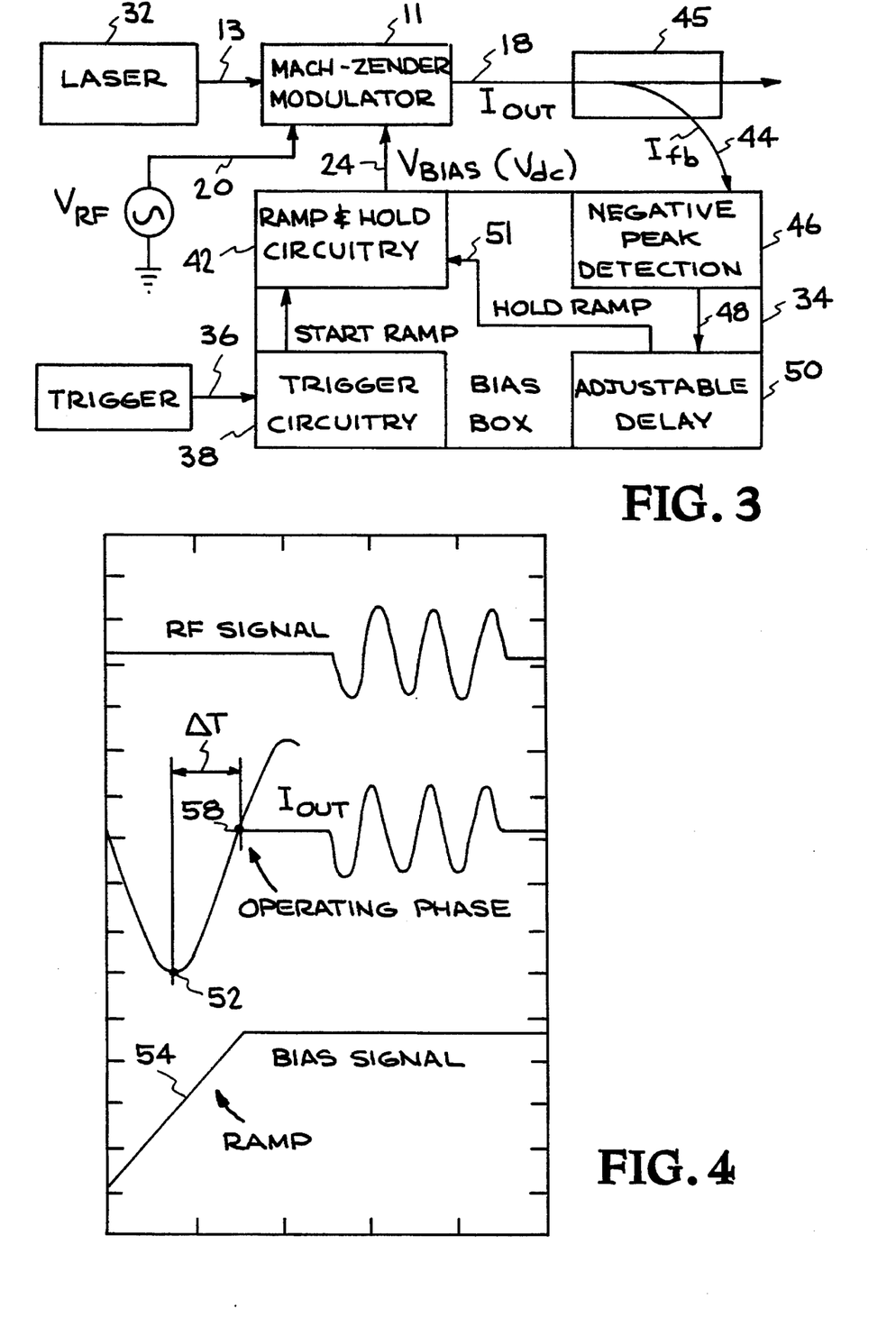
FIG. 3 is a block diagram of the DC bias box of the invention in combination with a conventional Mach-Zehnder modulator.
FIG. 4 illustrates an overlaid graph of RF voltage, DC bias voltage, and the resulting optical output modulation ($I_o$) by an RF signal at a fixed phase φ and operating point (OP) of the DC modulated optical beam.

A block diagram of a conventional Mach-Zehnder modulator 11 is illustrated in FIG. 3 incorporating the invention circuit which is enclosed in an accompanying bias box group, generally indicated as 34. A beam modulating RF voltage 20 is applied to one port of Mach-Zehnder modulator 11 and a DC bias voltage 24 is applied to another port of modulator 11 as initiated in bias box 34 by a trigger signal 36. Trigger 36 is applied to a trigger circuit 38 which starts a voltage ramp at the DC bias signal applied to modulator 11 bias input 24 by means of a ramp and hold circuit 42. Bias box 34 is triggered during a latency interval within RF signal 20. Trigger 36 initially causes ramp and hold circuit 42 to force DC bias signal 24 to be set to a negative voltage. Once set, DC bias signal 24 is forced into a linear ramp which causes the optical output 18 of modulator 11 to follow the $cos^2$ transfer function in time at a frequency governed by $V_\pi$ and the slew rate of the DC voltage bias 24 ramp. As the optical output 18 is modulated, an optical feedback ($I_{fb}$) portion 44 from fiber optical coupler 45 is applied to bias box 34 circuitry to be monitored to determine the occurrence of a minimum in optical output $I_o$. A minimum optical output is detected by a negative peak detection circuit 46 which upon detecting a negative peak issues a ramp hold command 48 to an adjustable delay circuit 50. A negative peak would represent an operating phase of zero radians, which forces phase φ to equal zero. To set the operating phase of modulator 11, the linear DC ramp is allowed to continue by a delay command 51 after detection of a known minimum for a specified interval before being stopped and held as determined by adjustable delay circuit 50.

The circuit design of bias box 34 is based on the periodic nature of the transfer function of modulator 11 illustrated in FIG. 2. When the linear ramped DC bias voltage 24 is applied to the DC electrode input of modulator 11, while the RF electrode input 20 is inactive, the resulting optical output signal 18 will represent the transfer function of modulator 11 as illustrated in FIG. 4 where the graph of optical output 18

($I_o$) in time (T) is overlaid and combined between the graph of the ramped DC bias voltage 24 ($V_{dc}$) in time, and the RF modulating signal ($V_{rf}$) in time. By detecting a minimum point (MP) 52 on the DC modulated optical output signal 18 where modulator output noise is at a minimum, a reference point (RP) 52 on the transfer curve can be established. If linear ramp 54 is allowed to continue for a predetermined time delay (ΔT) after detection of reference point 52, and then held, any operating point (OP) 58 can be established. When this technique is used immediately prior to modulation by the RF signal 20, the operating point 58 will be stable and known. Stability is insured because the RF signal 20 is applied before any long term drifts in φ can occur.

Figure 5A:
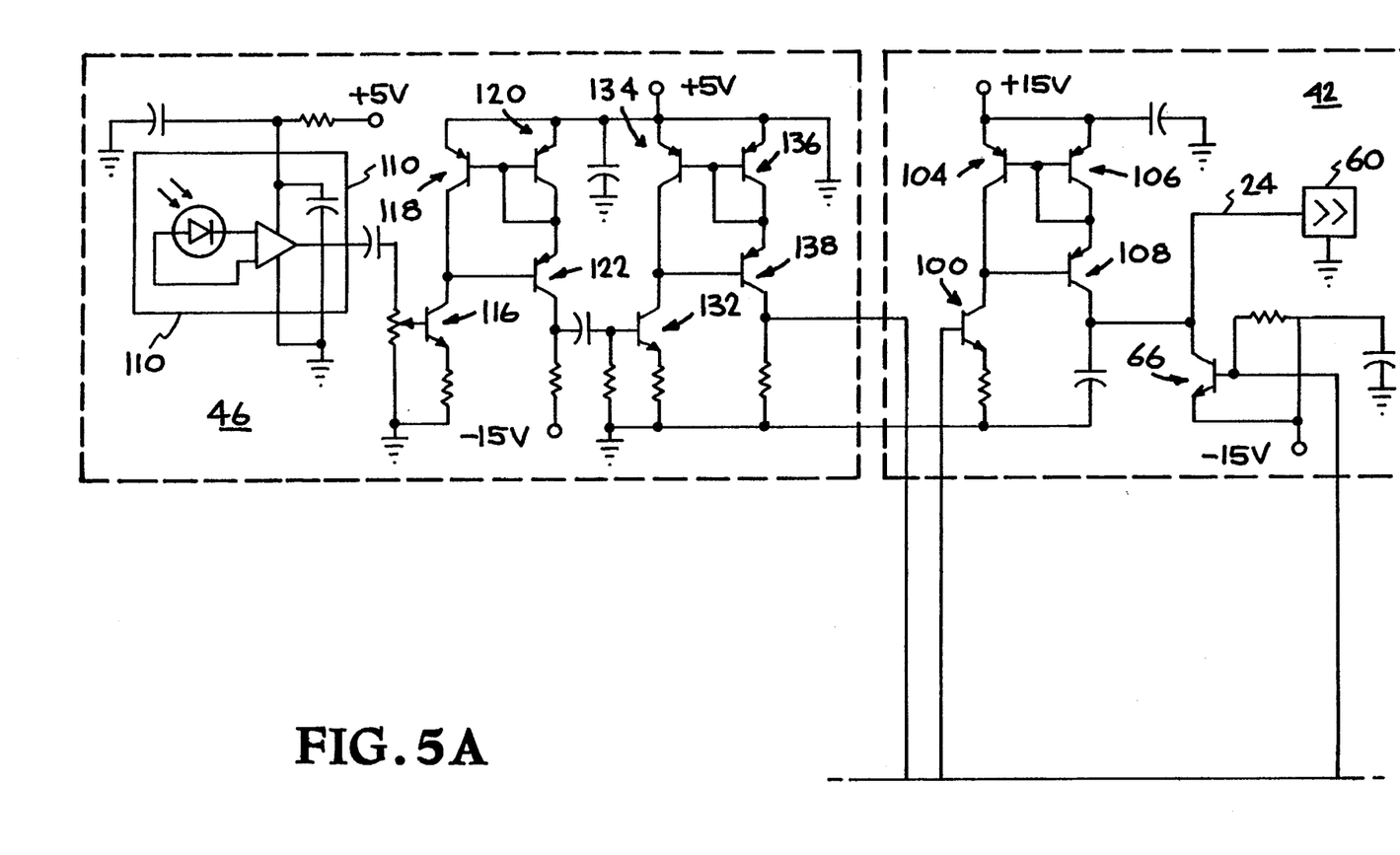
FIG. 5 is a detailed schematic circuit of the bias box of the invention.
Figure 5B:
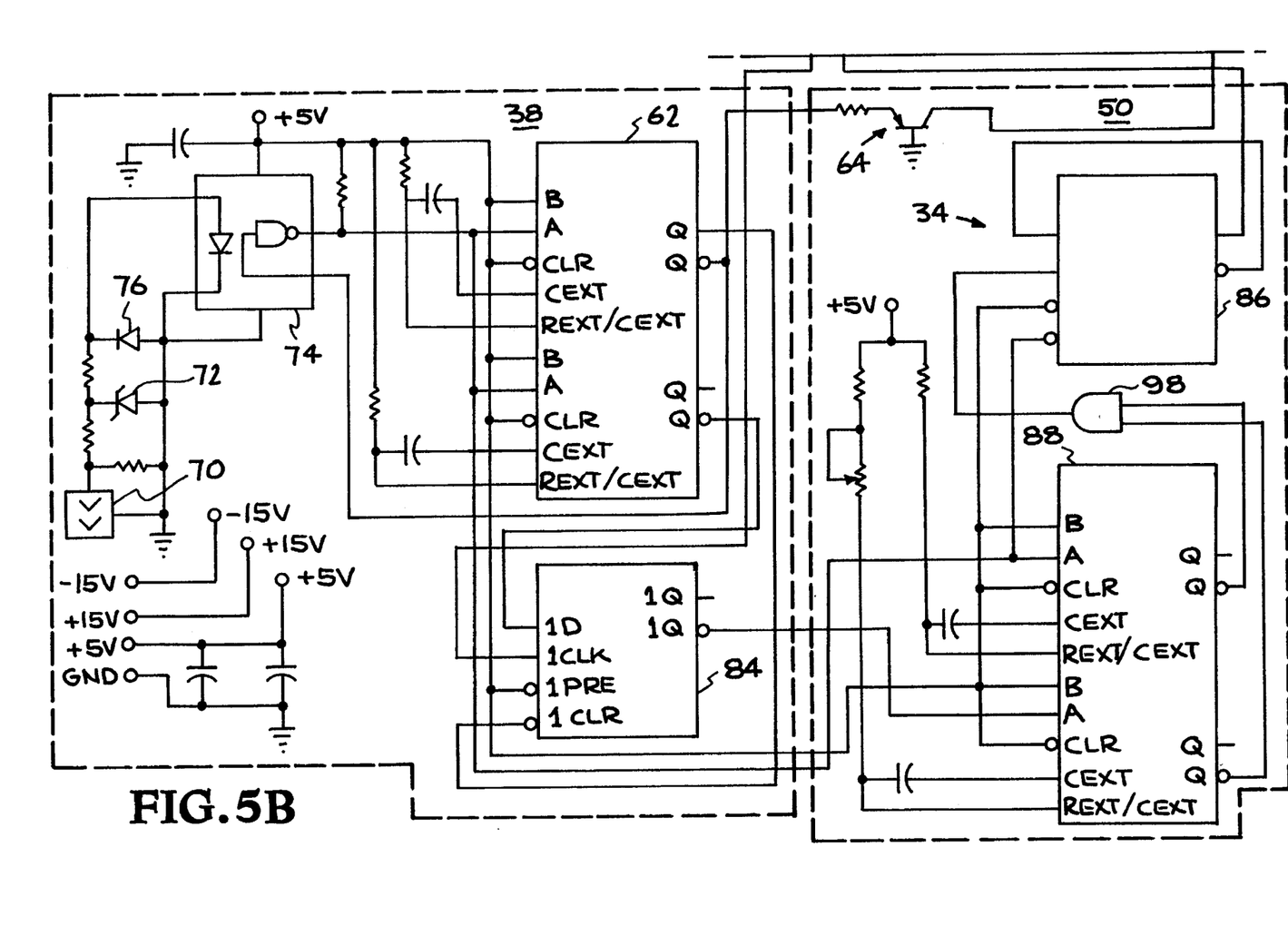

Referring now to FIG. 5, a more detailed best mode schematic of the DC bias box 34 will be described. It will be understood that all designated resistance values are in ohms (Ω), and all designated capacitance values are in microfarads (μF) unless otherwise indicated in the circuit schematic of FIG. 5. Upon power up, the DC bias output 24 of bias box 34 at an SMA coaxial connector 60 is forced to −12 V by the inactive state of a one shot package 62 (74LS221) Q output which is at a TTL logic high of 3 V. One shot 62 drives the emitter of a common base PNP transistor 64 through a 1 KΩ resistor R22 which forces 2.3 mA out of the collector of transistor 64 and across a 1 KΩ resistor R8 at the base of an NPN transistor 66. With the base of transistor 66 coupled to −15 V through R8, and neglecting a small amount of current lost into the base of transistor 66, the base voltage becomes −12.7 V. Since the emitter of transistor 66 is tied to −15 V, the base emitter voltage becomes positive, forcing transistor 66 on and into saturation. Saturation causes the base current to increase; thus the majority of current at the base is diverted from R8 into the base, thereby dropping the base voltage until it reaches approximately −14.3 V. Transistor 66 will stay in saturation, forcing the collector to emitter voltage to 0.2 V. Therefore, the voltage at the collector of transistor 66 becomes −14.8 V, which is the DC bias voltage seen at output 60 upon power up.

It will be observed that the schematic of FIG. 5 is divided into the four circuit components of bias box 34 of FIG. 3. Each component circuit is delineated by dashed lines and corresponds to the four basic components of the DC bias circuit: trigger circuit 38, ramp and hold circuit 42, negative peak detector circuit 46, and adjustable delay circuit 50.

Trigger circuit 38 is initiated externally to begin the phase positioning sequence. A trigger pulse is applied through a second SMA coaxial connector 70 positioned on the PC board of the DC bias circuit. The trigger pulse should be capable of driving at least 3 V into 50 Ω. The trigger pulse input circuitry is protected by a Zener diode 72 (1N746A) which clamps the trigger pulse to 3.3 V, thereby allowing trigger pulses of a few hundred volts amplitude to be applied to the circuit for duration of a few microseconds (μs). A 51Ω resistor R11 in series with Zener diode 72 limits current of the trigger input when diode 72 is turned on, and a 220 Ω resistor R12 in series therewith limits the input current of an optical isolator 74 (HCPL-2601) to a desired 12 mA. A switching diode 76 (BAL99LT1) in parallel with Zener diode 72 is included to protect optical isolator 74 from reverse voltage swings.

Optical isolator 74 is used to accept non-TTL level trigger pulses and to protect the downstream circuitry from large amplitude trigger pulses. There is no isolation with this particular circuit from trigger source ground loops since the circuit ground is connected to the optical isolator 74 ground pin. Historically this has not been a problem even in systems that are separated from their trigger source by 1 km or even more. If such problems do arise, then breaking the ground connection between optical isolator 74 and the system ground can be easily accomplished. Optical isolator 74 has an open collector output and therefore a 360 Ω resistor R13 is required as a pull-up to a +5 V power source. Upon receiving a positive trigger pulse at input 70, optical isolator 74 output will swing negative from +5 V to +0.7 V, which is a TTL low level logic signal. This negative transition as seen at one shot package 62 will cause it to trigger.

Duration of a pulse at the Q outputs, pins 4 and 13, of one shot 62 is determined by a 2 kΩ resistor R15 in series with a 0.1 μF capacitor C7 input at $C_{ext}$ to one shot 62. These RC values are chosen to give a 150 μs pulse duration. One shot 62 Q-not output at pin 4 provides a negative logic, low level +0.7 V output with a 150 μs pulse duration to disable optical isolator 74 at the "E" input to terminate its output. The 150 μs gap is necessary to reject any trigger pulses during that period and thereby reduce the probability of unwanted multiple triggers from line reflections on the trigger cable induced by termination mismatch. When one shot 74 Q-not output at pin 4 is at a low logic level to the emitter of transistor 64 and subsequently the base of transistor 66, transistor 66 is turned off. Therefore, the DC bias output at connector 60 now reflects the voltage held across a 0.01 μF capacitor C4 which is at −14.8 V.

The Q output at pin 13 of one shot 62 is a positive logic signal of +3.0 V for 150 μs and is applied to a first D-Flip Flop 84 (74ACT74) at the CLR pin, thereby enabling Flip Flop 84 for 150 μs. A second D-Flip Flop 86 (74ACT74) is also enabled at its CLR pin by the negative transition of the "F" output of optical isolator 74. By such means ramp circuitry is enabled upon receipt of a trigger.

Optical isolator 74 "F" output is also applied to a second one shot 88 (74LS221) at pin 1 to create a 2 μs negative logic pulse to disable the ramp generator circuitry 42 while the laser source 32 (FIG. 3) is stabilizing after power up. A 3 KΩ resistor R18 in series with a 0.001 μF capacitor C10 create the RC time constant for the 2 82 s pulse duration at second one shot 88.

First one shot 62 pin 6 is triggered by the output of optical isolator 74. The duration of the pulse at one shot pin 6 is determined by the 3.6 KΩ resistor R16 and the 0.001 μF capacitor C10. The respective RC value gives a 3 μs pulse duration at one shot 62 pin 6. This value is used to disable the peak detector circuit 46 during laser power up and to ignore transients from the turn on of the ramp circuit 42.

At the end of the 2 microsecond period, the output of second one shot 88 pin 4 will swing positive to +3.0 V. Pin 4 output is AND'd with the output of pin 12 which pulses upon detection of a negative peak within the optical signal. Since pin 12 output is at a logic high of +3.0 V when no peak is observed, the rising edge from pin 4 is passed through AND gate 98 (74AC08). Output of AND gate 98 clocks second D-Flip Flop 86, causing the output at pin 9 to toggle to a positive 3.0 V. The D input at pin 12 is toggled to a negative logic +0.7 V, thereby setting the flip flop 86 up to be reset upon the next clock signal, which should occur upon detection of a negative peak in the optical wave form.

The +3.0 V from the output of second Flip Flop 86 pin 9 drives the base of NPN transistor 100. With +3.0 V at the base and a 51 ohm resistor R6 at the emitter, 45 milliamps will flow through the transistor collector. The three PNP transistors 104, 106, and 108 at the collector of transistor 100 form a PNP Wilson current mirror. Therefore, 45 mA will also flow out the collector of transistor 108. The Wilson mirror current will flow directly into 0.01 microfarad capacitor C4 at the DC bias output 24. The Mach-Zehnder DC bias voltage port which is connected directly to port 60 has a very low capacitance of only a few hundred picofarads and is therefore ignored. The voltage across capacitor C4 will change according to the following equation:

$$\partial V_{dc}/\partial t = I/C4$$
$$= 4.5 \, V/\mu s$$

The foregoing formula gives the ramp slew rate. The DC voltage ramp starts at −14.8 V and climbs at a rate of 4.5 V/μs.

As the $V_{dc}$ port is ramped, the optical output of modulator 11 (FIG. 3) oscillates according to the $\cos^2$ transfer function of the Mach-Zehnder. Using a fiber splitter, a portion of the optical output signal is brought into the bias box 34 where a photodetector 110 (HFBR-2406) will convert the optical signal into an electrical signal. Specifications of photodetector 110 require the output to be AC coupled into a load of 500 ohms. This is accomplished with a 0.1 microfarad capacitor C3 and a 500 ohm potentiometer R21.

The wiper for potentiometer R21 is attached to the base of a NPN transistor 116 which allows attenuation of the electrical signal representing modulator 11 output to be varied. The negative peak from photodetector 110 should appear very close to zero volts at the base of transistor 116 since laser 32 has been off and thereby not allowing capacitor C3 to charge. The RC time constant formed by capacitor C3 and potentiometer R21 is large compared to the frequency of the signals involved at transistor 116. Large signal excursions may actually saturate transistor 116. Saturation, however, is acceptable since a large gain is desired, and distortion introduced into the large signal portion of the signal is ignored. Three PNP transistors 118, 120, and 122 attached to the collector of transistor 116 form a Wilson current mirror. Current flowing from the collector of PNP transistor 122 will be identical to the current flowing through the collector of NPN transistor 116. The amplifier circuit formed of transistors 116, 118, 120, 122 has a gain at its output across 2k ohm resistor R2 defined as:

$$A_V = V_{in}(R2/R1) \, a$$

With R1 at 10 ohms and R2 at 2k ohms, the voltage gain for the circuit is 200. The attenuation "a" introduced by potentiometer R21 is used to adjust the gain of this amplifier stage. A high gain is necessary to overcome the noise introduced by the next stage of the peak detector circuit.

The output signal across resistor R2 of the amplifier is differentiated by the RC network formed by a 47 picofarad capacitor C1 and a 510 ohm resistor R3. This circuit will perform the differentiation with a minimum phase error since the RC time constant is much shorter than the period of the signal to be differentiated. Phase error for the circuit is given by the following formula:

$$E = -\tan^{-1}[(.5V/\mu s)(C1)(R3)/V_\pi]$$

For the values of 47 pF for capacitor C1 and 510 Ω for resistor R3 and 6 V for $V_\Omega$, the error is 18 milliradians or 1°.

The differentiator will attenuate the signal appreciably; therefore a second amplifier is included formed by NPN transistor 132 and PNP transistors 134, 136, and 138. With resistor values as indicated in FIG. 5, the gain for the amplifier stage is 100. Output of this amplifier stage is across a 1 kΩ resistor R5. A negative peak in the optical signal should then form a sharp positive going pulse across resistor R5 which is TTL compatible because of the +5 V power supply used to power the amplifier stages. The negative logic pulse should be as sharp as possible to minimize any additional phase error in the detection of the optical minimum. Sharpness can be achieved by maximizing the gain in the two amplifiers.

The rising edge of this negative logic pulse is used to clock first Flip Flop 84 at pin 3 which forces the FF output at pin 6 to swing to a low logic level of +0.7 V. This output will then cause second one shot 88 to send a negative logic pulse out at pin 12. The duration of this pulse is determined by a 2 k ohm resister R19, a 20 k ohm potentiometer R20, and a 470 picofarad capacitor C11. By adjusting potentiometer R20, the duration of the pulse can be varied from 1 microsecond to 10 microseconds. The rising edge of the output at pin 12 at the end of a pulse will cause second Flip Flop 86 to be clocked, thereby causing the output at pin 9 to toggle to a logic low state. A logic low state from second Flip Flop 86 forces the base of NPN transistor 100 to a low voltage level, thereby shutting off the DC ramp current to capacitor C4. The ramp at the DC bias port 60 stops and the respective DC voltage attained is held. This voltage sets the operating phase of the Mach-Zehnder modulator 11.

Operating phase can be adjusted by varying potentiometer R20. Phase (P) can be equated to a delay ΔT introduced using the following equation:

$$P = \pi(.5V/\mu s)\Delta T/V_\pi (radians)$$

For a $V_\pi$ of 6 V, the attainable phase range for this device is greater than 360°. It will be noted that the arbitrary phase term φ is not included in the above equation because φ is eliminated by referencing the operating phase to the minimum of the transfer function, which by definition is when φ=0°.

Figure 6:
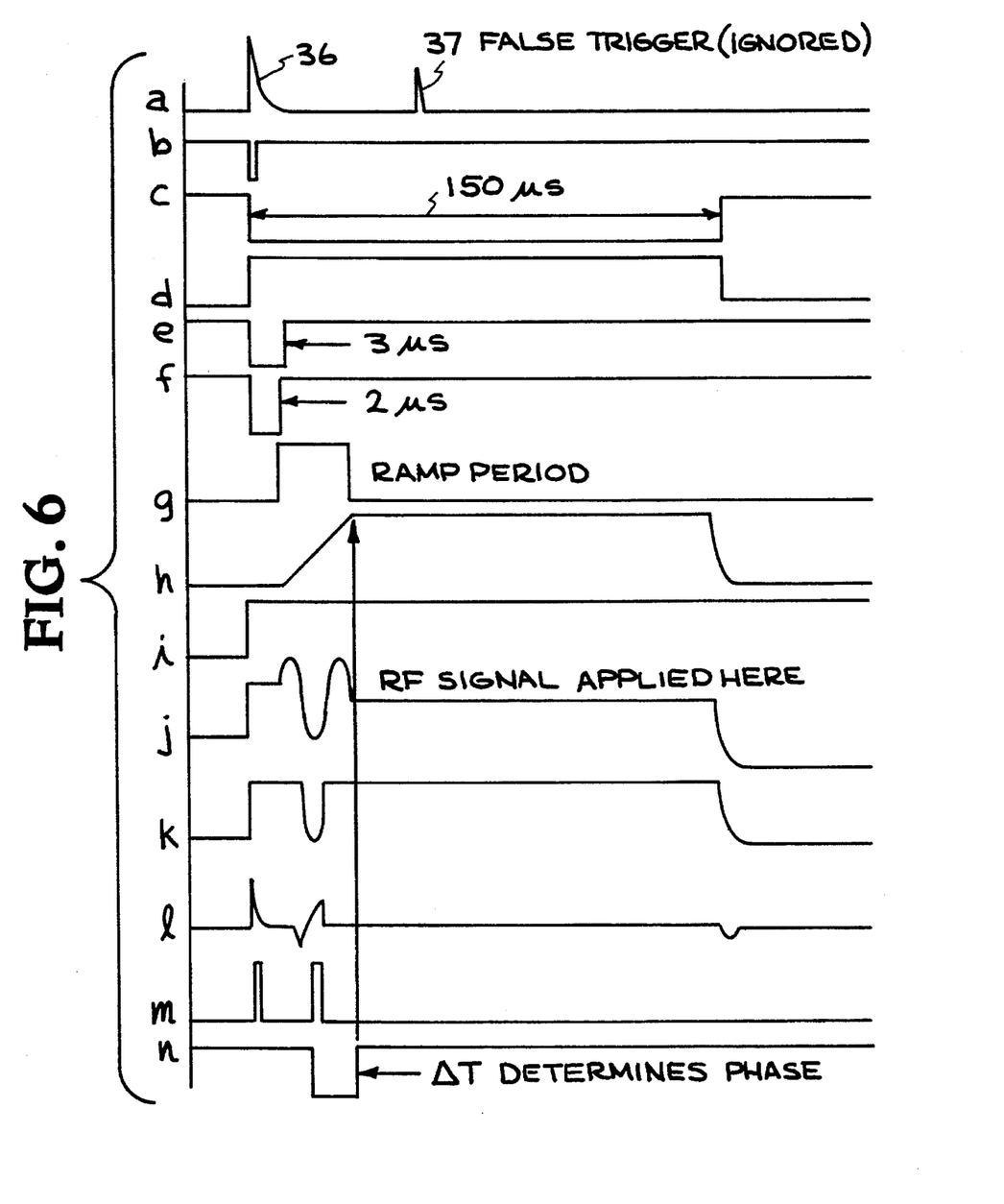
FIG. 6 depicts relative timing diagrams of various elements of the schematic of FIG. 5.

Referring now to FIG. 6, a brief explanation of timing diagrams (TD) for various points and components of the circuit will be given. TD #a is the trigger pulse 36 input at SMC port 70. A false trigger pulse 37 is also illustrated as a possibility to indicate that in view of the window of TD #b, the false glitch would be ignored. TD #b indicates the output at pin 6 of optical isolator 74 to activate first and second one shots (OS) 62 and 88, as well as first and second flip flops (FF) 84 and 86. TD #c indicates the 150 microsecond delay low TTL (Q not) output at pin 4 of first OS 62 into first FF 84. TD #d indicates the 150 microsecond delay high TTL (Q) output at pin 13 of first OS 62 to clear first FF 84. TD #e indicates the 3 microsecond (Q not) output of first OS 62 at pin 12 into the D input of first FF 84. TD #f is the 2 microsecond (Q not) output at pin 4 of second FF 88 into AND gate 98. TD #g illustrates the variable ramp period Q output at pin 9 of second FF 86 into the base of and to turn on integrating transistor 100 to begin the DC ramp. TD #h indicates the integrated DC bias ($V_{dc}$) output at SMC port 60 into one input port of the Mach-Zehnder modulator 11. TD #i indicates the laser 32 optical input (Ii) into modulator 11. TD #j indicates the DC modulated output 18 of modulator 11 and the variable time domain where an RF signal may be applied to further modulate the laser to add intelligible information. TD #k indicates the voltage across resistor R2 of the negative peak detector circuit 46. TD #1 indicates the differentiation output of capacitor C1 and resistor R3 of negative peak detector circuit 46. TD #m illustrates the integrated and amplified output of negative peak detector circuit 46 at resistor R5. TD #n shows the ΔT selected time interval at output pin 12 of OS 88 allowed for the DC bias ramp to run its course and to stop at a particular phase $\phi$ of the modulated optical output ($I_o$).

Although there has been described in detail an enabling and preferred embodiment of a best mode of operation of the invention, it will be understood that the foregoing individual components, elements, or circuits are utilized only for purposes of illustration of a particular embodiment of the invention and by no means is the invention breadth and scope to be limited by such components alone but instead the invention is intended to be limited only by the extent and interpretation of the following claims.

We claim:

1. A DC bias controller for an integrated electro-optic modulator with a DC and RF modulated optical output, comprising:

a trigger circuit;

a DC ramp and hold circuit coupling said trigger circuit to said modulator;

a negative peak detector circuit coupled to said optical output; and an adjustable delay circuit coupling said peak detector circuit to said ramp and hold circuit.

2. A DC bias controller according to claim 1, wherein said trigger circuit comprises:

means for limiting an input voltage;

means in parallel with said voltage limiting means for preventing a reverse voltage;

means coupled to said reverse voltage preventing means for isolating non-TTL trigger pulses from TTL components of said trigger circuit;

first logic means coupled to said pulse isolation means for receiving a trigger pulse, and for appropriately initializing said ramp and hold circuit; and second logic means coupled between said first logic means and said negative peak detector circuit and said adjustable delay circuit for clocking pulses therebetween.

3. A DC bias controller according to claim 2, wherein said input voltage limiting means consists of a Zener diode.

4. A DC bias controller according to claim 3, wherein said reverse voltage preventing means consists of a diode.

5. A DC bias controller according to claim 4, wherein said trigger pulse isolating means consists of an optical isolator.

6. A DC bias controller according to claim 5, wherein said first logic means consists of a one shot.

7. A DC bias controller according to claim 6, wherein said second logic means consists of a flip flop.

8. A DC bias controller according to claim 1, wherein said DC ramp and hold circuit comprises:

initiating means for setting a low TTL logic level DC ramp as a minimum DC bias output;

switching means coupling said initiating means to said trigger circuit for starting said DC ramp progression;

current amplification means coupled to said initiating means for increasing amount of power output;

integrating means coupled to said current amplification means for summing current for an increasing DC voltage ramp output;

third logic means coupled between said adjustable delay circuit and said current amplification means for clocking and counting pulses therebetween during said DC ramp; and fourth logic means coupling said adjustable delay circuit to said third logic means for sequencing said count.

9. A DC bias controller according to claim 8, wherein said initiating means consists of a normally off NPN transistor the base of which is coupled to a negative source.

10. A DC bias controller according to claim 9, wherein said switching means consists of a PNP transistor the emitter of which is coupled to said trigger circuit and the collector of which is coupled to said initiating means.

11. A DC bias controller according to claim 10, wherein said amplification means consist of a plurality of PNP transistors comprising a Wilson current mirror.

12. A DC bias controller according to claim 11, wherein said integrating means consists of a capacitor coupled to said amplification means.

13. A DC bias controller according to claim 12, wherein said third logic means consists of a flip flop.

14. A DC bias controller according to claim 13, wherein said fourth logic means consists of an AND gate.

15. A DC bias controller according to claim 1, wherein said negative peak detector circuit comprises:

optical variation detector means coupled to said optical output;

sensitivity adjustment means coupled to said optical detector means;

first amplification means coupled to said adjustment means;

negative peak differentiation means coupled to said first amplification means; and second amplification means coupled to said differentiation means to said trigger circuit and to said ramp and hold circuit.

16. A DC bias controller according to claim 15, wherein said optical variation detector means is a diode photodetector..

17. A DC bias controller according to claim 16, wherein said sensitivity adjustment is a capacitor in series with a potentiometer.

18. A DC bias controller according to claim 17, wherein said first and second amplification means are Wilson current mirrors.

19. A DC bias controller according to claim 18, wherein said peak differentiation means consists of a capacitor with a resistor shunt to ground.

20. A DC bias controller according to claim 19, wherein said adjustable delay circuit comprises:

a fifth logic means; and at least one of fixed and variable timing elements coupled to said fifth logic means.

21. A DC bias controller according to claim 20, wherein said fifth logic means consists of a second flip flop.

22. A DC bias controller according to claim 21, wherein said variable timing element consists of a potentiometer and capacitor, RC circuit.

23. In a Mach-Zehnder electro-optic modulator comprising an optical waveguide that splits into two waveguides and then recombines, wherein said waveguides are acted upon by a RF information modulating signal, and a DC bias modulating signal to convert an electrical signal to an optical signal at a predetermined operating point of the $\cos^2$ transfer function of said modulator output, wherein a DC bias modulation circuit improvement comprises:

trigger means for initializing and initiating said DC modulation circuit;

ramp and hold means for ramping and increasing said DC bias to any preselected time and phase $\phi$ of said $\cos^2$ transfer function and which can hold for a predetermined time delay while said RF signal is applied to said transfer function;

negative peak detection means for determining when said $\cos^2$ transfer function optical output is at a minimum, i.e. negative peak, for initiating the next trigger pulse; and adjustable delay means for varying said predetermined time delay and thereby varying the phase $\phi$ at which said RF modulation is to take place.

24. An electro-optic modulator $\cos^2$ transfer function phase positioning method, comprising the steps of:

triggering a DC bias to said modulator;

ramping said DC bias for a predetermined phase time to a specific phase $\phi$ of said $\cos^2$ transfer function;

detecting a negative peak of said $\cos^2$ transfer function as a starting point for said DC ramp sequence;

holding said phase for a designated RF data transmission time; and applying an RF modulating signal at said DC modulated phase.

* * * * *